(12) United States Patent
Hong et al.

(10) Patent No.: US 11,748,891 B2
(45) Date of Patent: Sep. 5, 2023

(54) AUTOMATIC CONTAINER LOADING AND UNLOADING APPARATUS AND METHOD

(71) Applicant: Shanghai Master Matrix Information Technology Co., Ltd., Shanghai (CN)

(72) Inventors: Junming Hong, Shanghai (CN); Huan Chen, Shanghai (CN)

(73) Assignee: Shanghai Master Matrix Information Technology Co., Ltd., Shanghai (CN)

( * ) Notice: Subject to any disclaimer, the term of this patent is extended or adjusted under 35 U.S.C. 154(b) by 0 days.

(21) Appl. No.: 17/799,010

(22) PCT Filed: Feb. 26, 2021

(86) PCT No.: PCT/CN2021/078140
§ 371 (c)(1),
(2) Date: Aug. 11, 2022

(87) PCT Pub. No.: WO2021/196938
PCT Pub. Date: Oct. 7, 2021

(65) Prior Publication Data
US 2023/0060463 A1     Mar. 2, 2023

(30) Foreign Application Priority Data
Mar. 31, 2020   (CN) .......................... 202010240029.2

(51) Int. Cl.
*G06T 7/12*       (2017.01)
*G06T 7/521*      (2017.01)
(Continued)

(52) U.S. Cl.
CPC ................ *G06T 7/12* (2017.01); *B65G 69/24* (2013.01); *B65G 69/26* (2013.01); *B66C 13/18* (2013.01);
(Continued)

(58) Field of Classification Search
CPC .. G06T 7/12; G06T 7/10; G06T 7/521; G06T 7/543; G06T 7/564; B65G 69/24;
(Continued)

(56) References Cited

U.S. PATENT DOCUMENTS

| 6,201,203 B1* | 3/2001 | Tilles | B65G 65/00 209/540 |
| 2021/0291902 A1* | 9/2021 | Wang | B62D 15/021 |
| 2021/0356261 A1* | 11/2021 | Jin | G01B 11/24 |

FOREIGN PATENT DOCUMENTS

| CN | 104200212 A | 12/2014 |
| CN | 108828518 A | 11/2018 |

(Continued)

OTHER PUBLICATIONS

International Search Report and Written Opinion for International Application No. PCT/CN2021/078140, dated Jun. 2, 2021, 6 pages.

(Continued)

*Primary Examiner* — John B Strege
(74) *Attorney, Agent, or Firm* — NSIP Law (57) ABSTRACT

The present invention provides an automatic container loading and unloading apparatus and method. The apparatus comprises: a data acquisition module, used for scanning a container truck panel to obtain laser point cloud data; a data preprocessing module, used for segmenting a laser point cloud on a surface of the container truck panel from the laser point cloud data; a key point extraction module, used for performing edge extraction on the laser point cloud on the surface of the container truck panel to obtain discrete points on edges of the keel of the container truck panel; and a straight line fitting module, used for performing random sample consensus straight line fitting on the discrete points on the edges of the keel of the container truck panel to obtain spatial straight lines of the edges of the keel of the truck panel. The automatic container loading and unloading appa- (Continued)

ratus and method provided by the present invention using spatial straight lines on the edges of the keel of the container truck panel for computing processing, thereby achieving stronger robustness and higher accuracy, so that a container is loaded onto the container truck panel with higher precision and lower calculation amount.

8 Claims, 5 Drawing Sheets

(51) Int. Cl.
<table>
<tr><td>B65G 69/24</td><td>(2006.01)</td></tr>
<tr><td>B65G 69/26</td><td>(2006.01)</td></tr>
<tr><td>B66C 13/18</td><td>(2006.01)</td></tr>
<tr><td>G06T 7/10</td><td>(2017.01)</td></tr>
<tr><td>G06V 30/19</td><td>(2022.01)</td></tr>
<tr><td>G06T 7/543</td><td>(2017.01)</td></tr>
<tr><td>G06T 7/564</td><td>(2017.01)</td></tr>
<tr><td>B65G 67/04</td><td>(2006.01)</td></tr>
</table>

(52) U.S. Cl.
CPC .............. *G06T 7/10* (2017.01); *G06T 7/521* (2017.01); *G06T 7/543* (2017.01); *G06T 7/564* (2017.01); *G06V 30/19127* (2022.01); *B65G 67/04* (2013.01)

(58) Field of Classification Search
CPC ........ B65G 69/26; B65G 67/02; B65G 67/04; B66C 13/18; B66C 13/46; B66C 13/48; G06V 30/19127
See application file for complete search history.

(56) References Cited

FOREIGN PATENT DOCUMENTS

<table>
<tr><td>CN</td><td>108932736 A</td><td>12/2018</td></tr>
<tr><td>CN</td><td>110142805 A</td><td>8/2019</td></tr>
<tr><td>CN</td><td>111115300 A</td><td>5/2020</td></tr>
<tr><td>EP</td><td>3613699 A1</td><td>2/2020</td></tr>
<tr><td>KR</td><td>201000058282 A</td><td>6/2010</td></tr>
</table>

OTHER PUBLICATIONS

Chinese Office Action for Chinese Application No. 202010240029.2, dated May 13, 2020, 8 pages.

* cited by examiner

AUTOMATIC CONTAINER LOADING AND UNLOADING APPARATUS AND METHOD

CROSS-REFERENCE TO RELATED APPLICATIONS

This is a national phase of International Application No. PCT/CN2021/078140, filed 26 Feb. 2021, which claims priority to Chinese Application No. 202010240029.2, filed 31 Mar. 2020. The disclosure of each of these applications is incorporated herein by reference in its entirety for all purposes.

TECHNICAL FIELD

The present invention relates to the field of crane loading and unloading, and more particularly to an automatic container loading and unloading apparatus and method.

BACKGROUND ART

At present, the port usually adopts manual operation for container loading and unloading. The driver of the tire crane operates the tire crane to load and unload the container below the truck (inner truck and outer truck). The disadvantage of manual operation by the driver of the tire crane is that the operation efficiency is low, and the operation quality is unstable. It often happens that the container is roughly smashed into the container truck guide panel, which has certain damage to the box and truck. There are some automatic transformation schemes in the prior art, for example, the contour of the container truck can be scanned by laser, and the container loading and unloading operation can be carried out after the location of the container truck is determined. However, in this way, for different types of container trucks and different types of truck panels, it is necessary to establish a template library for comparison, and it is prone to deviation, resulting in unsuccessful automatic loading and unloading.

Accordingly, there is a need to provide an automatic container loading and unloading apparatus which can realize the automatic loading and unloading of containers in container truck operation.

SUMMARY OF THE INVENTION

The technical problem to be solved by the present invention is to provide an automatic container loading and unloading apparatus and method using spatial straight lines on the edges of the keel of the container truck panel for computing processing, thereby achieving stronger robustness and higher accuracy, so that a container is loaded onto the container truck panel with higher precision and lower calculation amount.

The technical solution adopted by the present invention to solve the above technical problem is to provide an automatic container loading and unloading apparatus, comprising:

a data acquisition module, used for scanning a container truck panel to obtain laser point cloud data;

a data preprocessing module, used for segmenting a laser point cloud on a surface of the container truck panel from the laser point cloud data;

a key point extraction module, used for performing edge extraction on the laser point cloud on the surface of the container truck panel to obtain discrete points on edges of the keel of the container truck panel;

a straight line fitting module, used for performing random sample consensus straight line fitting on the discrete points on the edges of the keel of the container truck panel to obtain spatial straight lines of the edges of the keel of the truck panel.

Optionally, comprising a four-dimensional control module, used for controlling the height of a spreader to be adjusted, the rotation angle of the spreader to be adjusted, the position of a trolley to be adjusted, and the position of the container truck to be adjusted according to spatial straight lines of the edges of the keel of the container truck panel.

Optionally, the data acquisition module are lidars which are at least one, the lidars are installed on one side of an electrical room close to the container truck lane.

Optionally, obtaining spatial straight lines of the edges of the keel of the container truck panel comprising obtaining spatial straight lines of one edge of the keel of the container truck panel.

Optionally, obtaining spatial straight lines of the edges of the keel of the container truck panel comprising obtaining spatial straight lines of a first edge and spatial straight lines of a second edge of the keel of the container truck panel, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data.

Optionally, further comprising a space conversion module, used for horizontally projecting spatial straight lines of the edges of the keel of the container truck panel to obtain the height of a spreader to be adjusted, the rotation angle of the spreader to be adjusted, the position of a trolley to be adjusted and the position of the container truck to be adjusted.

The technical solution adopted by the present invention to solve the above technical problem is to provide an automatic container loading and unloading method, comprising the following steps:

scanning a container truck panel to obtain laser point cloud data;

segmenting a laser point cloud on a surface of the container truck panel from the laser point cloud data;

performing edge extraction on the laser point cloud on the surface of the container truck panel to obtain discrete points on edges of the keel of the container truck panel;

performing random sample consensus straight line fitting on the discrete points on the edges of the keel of the container truck panel to obtain spatial straight lines of the edges of the keel of the truck panel.

Optionally, further comprising the following step:

controlling the height of a spreader to be adjusted, the rotation angle of the spreader to be adjusted, the position of a trolley to be adjusted, and the position of the container truck to be adjusted according to spatial straight lines of the edges of the keel of the truck panel.

Optionally, scanning a container truck panel to obtain laser point cloud data is completed by a data acquisition module, the data acquisition module are lidars which are at least one, the lidars are installed on one side of an electrical room close to the container truck lane.

Optionally, obtaining spatial straight lines of the edges of the keel of the container truck panel comprising obtaining spatial straight lines of one edge of the keel of the container truck panel.

Optionally, obtaining spatial straight lines of the edges of the keel of the container truck panel comprising obtaining spatial straight lines of a first edge and spatial straight lines of a second edge of the keel of the container truck panel, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data.

Optionally, further comprising horizontally projecting spatial straight lines of the edges of the keel of the container truck panel to obtain the height of a spreader to be adjusted, the rotation angle of the spreader to be adjusted, the position of a trolley to be adjusted and the position of the container truck to be adjusted.

Compared to the prior art, the technical solutions of embodiments of the present invention have the following advantageous effects: An automatic container loading and unloading apparatus and method provided by the present invention, after obtaining the laser point cloud data, segmenting a laser point cloud on a surface of the container truck panel from the laser point cloud data, performing edge extraction on the laser point cloud on the surface of the container truck panel to obtain discrete points on edges of the keel of the truck panel, performing random sample consensus straight line fitting on the discrete points on the edges of the keel of the truck panel, achieving stronger robustness and higher accuracy, so that a container is loaded onto the container truck panel with higher precision and lower calculation amount.

Further, obtaining spatial straight lines of two edges of the keel of the container truck panel, wherein spatial straight lines of the first edge is used for controlling the height of a spreader to be adjusted, the rotation angle of the spreader to be adjusted, the position of a trolley to be adjusted, and the position of the container truck to be adjusted, and spatial straight lines of the second edge is used for calibrating and fusing spatial straight lines of the first edge, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data, so that the accuracy of the automatic container loading and unloading can be improved.

DETAILED DESCRIPTION OF THE INVENTION

The present invention will be further described below in combination with the accompanying drawings and embodiments.

In the following description, many specific details are set forth in order to provide a thorough understanding of the present invention. However, it will be apparent to those skilled in the art that the present invention can be practiced without these specific details. Therefore, the specific details are only exemplary, and the specific details may vary from the spirit and scope of the unrestrained and are still considered to be within the spirit and scope of the present invention.

Figure 1:
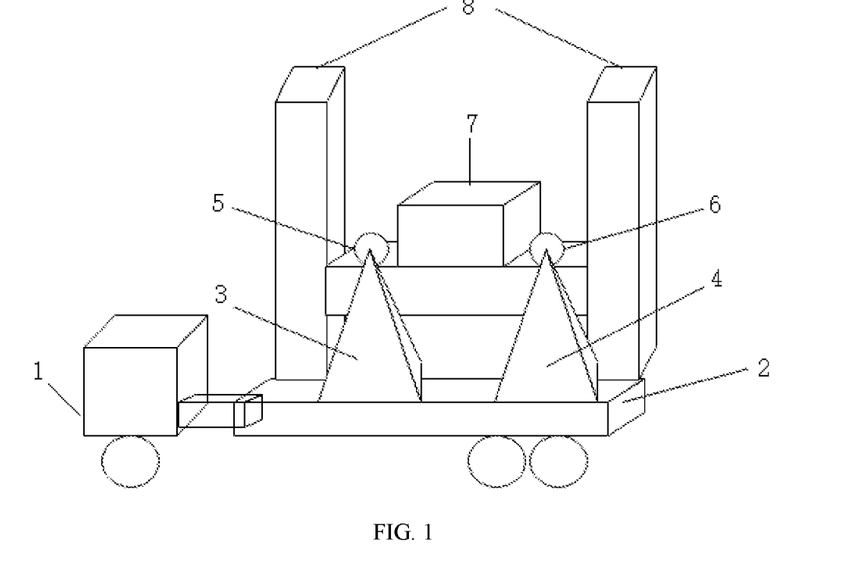
FIG. 1 is a structural diagram of an auomatic container loading and unloading apparatus according to an embodiment of the present invention.
Figure 2:
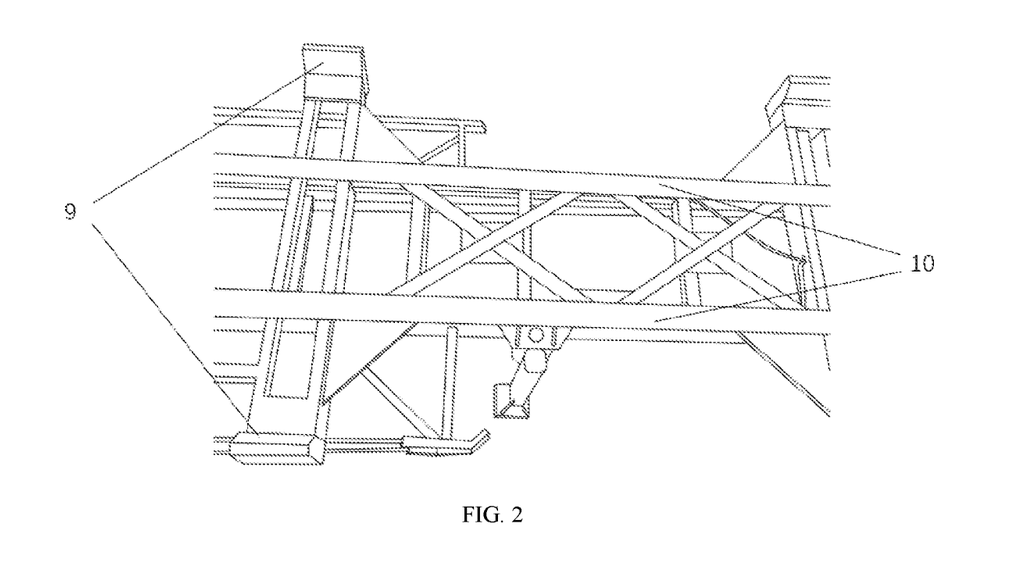
FIG. 2 is a structural diagram of a truck panel of an auomatic container loading and unloading apparatus according to an embodiment of the present invention.
Figure 3:
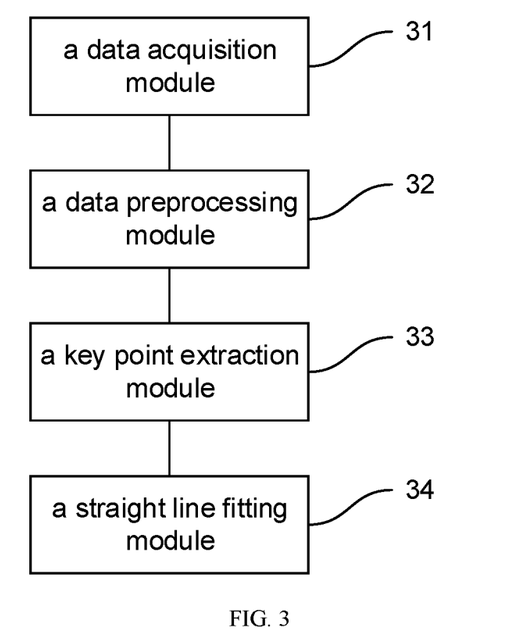
FIG. 3 is a module diagram of an auomatic container loading and unloading apparatus according to an embodiment of the present invention.

Now refer to FIG. 1 to FIG. 3, FIG. 1 is a structural diagram of an auomatic container loading and unloading apparatus according to an embodiment of the present invention. The auomatic container loading and unloading apparatus comprising a truck head 1, a container truck panel 2, a lidar 5, a lidar 6, an electrical room 7 and a tire crane beam 8, as well as laser ray 3 and laser ray 4 emitted by the lidar 5 and the lidar 6.

FIG. 2 is a structural diagram of a truck panel of an auomatic container loading and unloading apparatus according to an embodiment of the present invention. The truck panel comprising a container truck guide panel and keel 10 of container truck panel, the keel 10 of container truck panel has two which are parallel to each other.

Now refer to FIG. 3, FIG. 3 is a module diagram of an auomatic container loading and unloading apparatus according to an embodiment of the present invention. An automatic container loading and unloading apparatus, comprising: a data acquisition module 31, used for scanning a container truck panel 2 to obtain laser point cloud data; a data preprocessing module 32, used for segmenting a laser point cloud on a surface of the container truck panel from the laser point cloud data; a key point extraction module 33, used for performing edge extraction on the laser point cloud on the surface of the container truck panel to obtain discrete points on edges of the keel of the container truck panel; a straight line fitting module 34, used for performing random sample consensus straight line fitting on the discrete points on the edges of the keel of the container truck panel to obtain spatial straight lines of the edges of the keel of the truck panel. The data acquisition module 31 are lidars which is at least one, the lidars are installed on one side of the electrical room close to the truck lane.

In particular embodiment, the lidar 5 and the lidar 6 are multi line lidars, which are distributed at the front and rear ends along the direction of the cart, so that the respective laser rays 3 and laser rays 4 of the lidar 5 and the lidar 6 can cover a part of the container truck panel 2 respectively.

Figure 4:
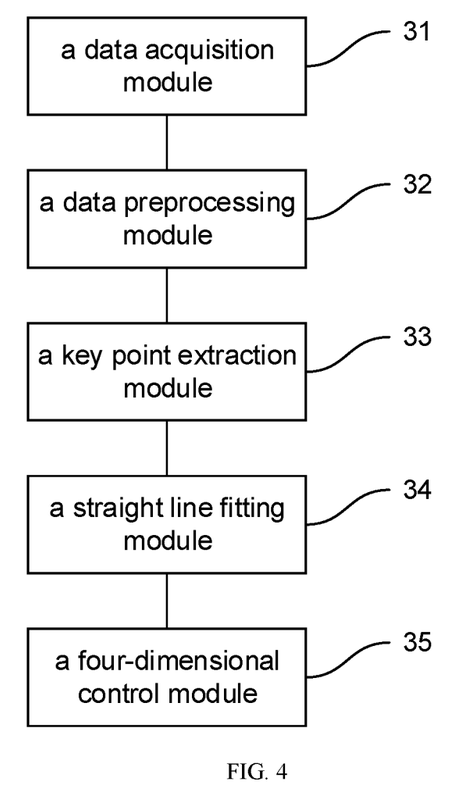
FIG. 4 is a module diagram of an auomatic container loading and unloading apparatus according to another embodiment of the present invention.

Now refer to FIG. 4, FIG. 4 is a module diagram of an auomatic container loading and unloading apparatus according to another embodiment of the present invention. In particular embodiment, further comprising a four-dimensional control module 35, used for controlling the height of a spreader to be adjusted, the rotation angle of the spreader to be adjusted, the position of a trolley to be adjusted, and the position of the container truck to be adjusted according to spatial straight lines of the edges of the keel of the container truck panel.

Figure 5:
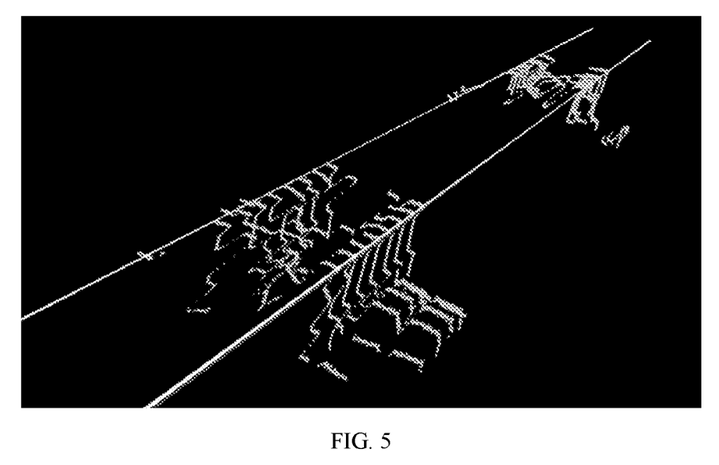
FIG. 5 is a schematic diagram of laser point cloud data obtained by an automatic container loading and unloading apparatus in an embodiment of the present invention.

Now refer to FIG. 5, FIG. 5 is a schematic diagram of laser point cloud data obtained by an automatic container loading and unloading apparatus in an embodiment of the present invention. The lidar 5 and the lidar 6 obtaining two clusters of sparse laser point clouds that fall on the container truck panel 2 by scanning the container truck panel 2. Each laser point cloud represents the local characteristics of the container truck panel 2. By plane fitting the laser point clouds at both ends, the laser point clouds on the upper surface of the container truck panel 2 can be segmented. The laser point cloud on the upper surface of the container truck panel 2 contains two keels 10 of the container truck panel 10. Then edge extraction and straight line fitting are carried out on the laser point cloud on the upper surface of the container truck panel 2, and two straight lines along the outer edges of the two keels 10 of the container truck panel 2 can be obtained.

In particular embodiment, obtaining spatial straight lines of the edges of the keel of the container truck panel comprising obtaining spatial straight lines of one edge of the keel of the truck panel.

However, in order to further check the data and improve the accuracy, obtaining spatial straight lines of the edges of the keel of the container truck panel comprising obtaining spatial straight lines of a first edge and spatial straight lines of a second edge of the keel of the container truck panel, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data.

In particular embodiment, the preset value of the included angle between spatial straight lines of the first edge and spatial straight lines of the second edge can be preset, the preset value can be preset by those skilled in the art based on empirical values. If the included angle is less than the preset value, fusing spatial straight lines of the first edge and spatial straight lines of the second edge, otherwise rescanning the container truck panel to obtain new laser point cloud data because the error between partial straight lines of the first edge and partial straight lines of the second edge is large. Wherein, for the plane fitting of laser point clouds at both ends, it is necessary to calibrate the two clusters of laser point clouds to the same coordinate system, carry out the front fusion of point clouds, and then adjust the spatial distance threshold of fitting points by setting the constraint relationship between the truck panel point cloud plane and the spatial plumb plane, and carry out plane segmentation, so as to obtain the laser point cloud clusters on the upper surface of the truck panel.

Further, the edge of the laser point cloud cluster on the upper surface of the container truck panel 2 is extracted. At this time, the discrete points on the edge of the keel 10 of the container truck panel are obtained by the combined ascending or descending arrangement of the x, y, z directions of the point cloud. These discrete points are fitted with RANSAC (Random Sample Consistency) straight lines, so as to obtain two spatial straight lines along the outer edge of the keel of the truck panel.

In particular embodiment, horizontally projecting spatial straight lines of the edges of the keel of the container truck panel to obtain the height of a spreader to be adjusted, the rotation angle of the spreader to be adjusted, the position of a trolley to be adjusted and the position of the container truck to be adjusted.

From the above two straight lines along the outer edge of the keel of the truck panel, combined with the calibration of the two lidars, the deflection angle of the container truck relative to the cart, the horizontal displacement relative to the cart, the vertical displacement relative to the spreader, and the position difference along the cart direction can be obtained. Thus, it can be converted into the rotation angle of the spreader, the position of the trolley to move, the height of the spreader to lower, and the distance to guide the container truck forward and backward.

Figure 6:
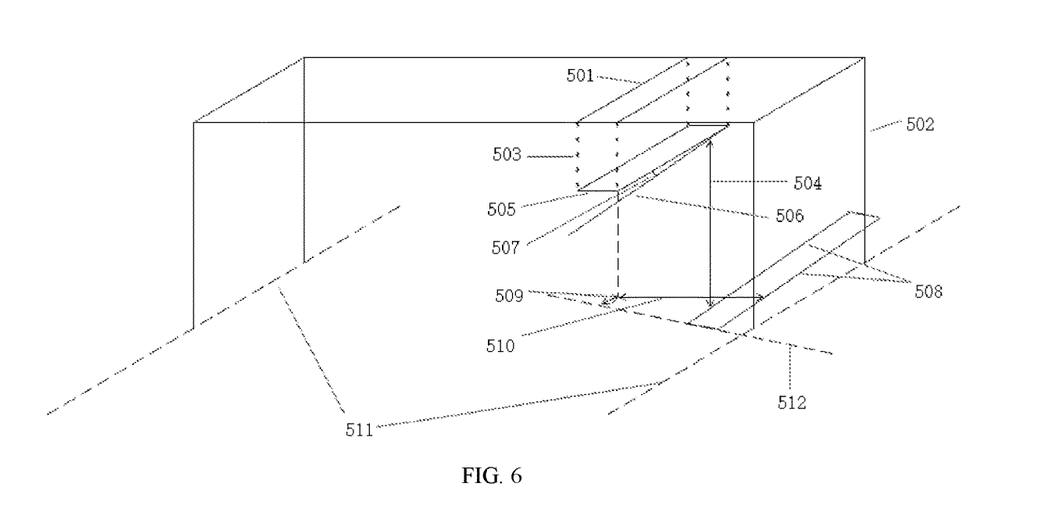
FIG. 6 is a schematic diagram of the calculation relationship of an automatic container loading and unloading apparatus in an embodiment of the present invention.

Specifically, refer to FIG. 6, 501 refers to a tire crane trolley, 502 refers to a tire crane cart, 503 refers to a steel wire rope, 504 refers to the distance h from the spreader to the container truck panel 2, 505 refers to a spreader, 506 refers to the linear space translation auxiliary line of the keel of the container truck panel, and 507 refers to an included angle $\theta$ between the spreader and the keel of the container truck panel, 508 is the edge straight line of the keel of the container truck panel, 509 is the horizontal projection distance d between the spreader 505 and the container truck panel 2 along the cart 502 direction, 510 is the horizontal projection distance X between the spreader 505 and the container truck panel 2 along the trolley 501 direction, 511 is the auxiliary line in the cart 502 direction, 512 is the auxiliary line at the end of the short side of the container truck panel 2.

When spatial straight lines of the outer edge of the keel of the container truck panel are obtained, the angle $\theta$ 507 of rotation of the spreader can be obtained through spatial transformation, the position x510 where the trolley needs to move, the height h504 at which the spreader needs to lower, and the distance d509 at which the container truck needs to be guided to move forward and backward.

Finally, IPC (Industrial Personal Computer) outputs control instructions to PLC (Programmable Logic Controller). PLC runs advanced control algorithm to control the rotation of the spreader, the movement of the trolley, and the lowering of spreader to the specified position. And the IPC outputs an indication to the indication panel, indicating the distance that the container truck should move forward or backward, so as to complete the automatic loading and unloading of the container truck.

Figure 7:
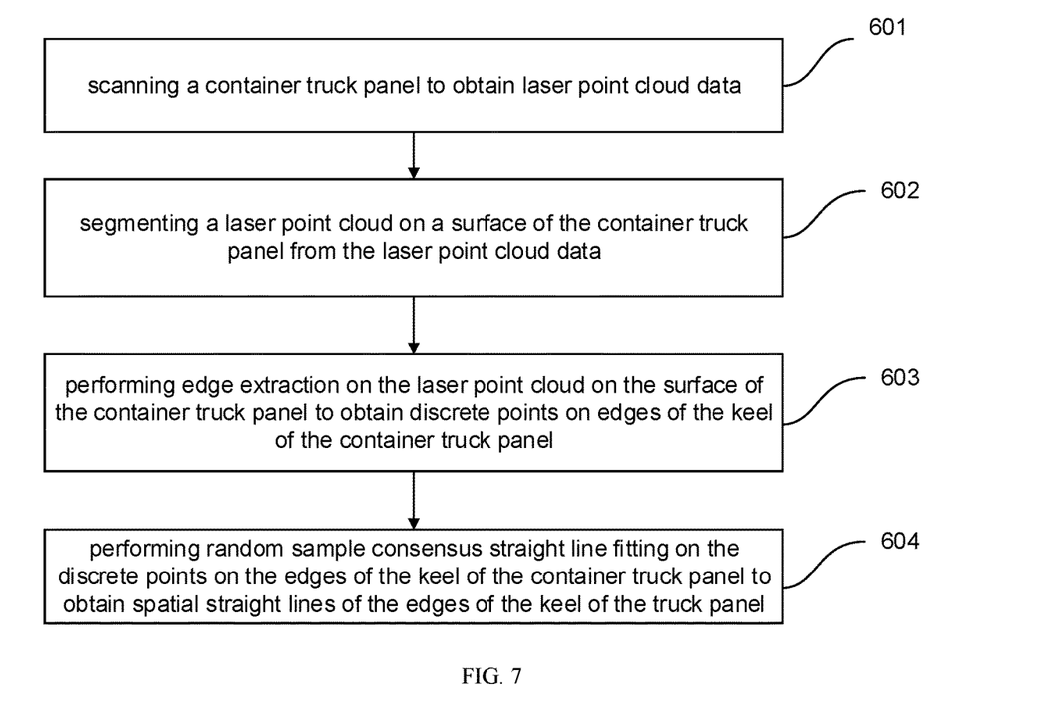
FIG. 7 is a flow chart of an automatic container loading and unloading method in an embodiment of the present invention.

Now refer to FIG. 7, the technical solution adopted by the invention to solve the above technical problems is to provide an automatic container loading and unloading method, comprising the following steps:

step 601: scanning a container truck panel to obtain laser point cloud data;

step 602: segmenting a laser point cloud on a surface of the container truck panel from the laser point cloud data;

step 603: performing edge extraction on the laser point cloud on the surface of the container truck panel to obtain discrete points on edges of the keel of the container truck panel;

step 604: performing random sample consensus straight line fitting on the discrete points on the edges of the keel of the container truck panel to obtain spatial straight lines of the edges of the keel of the truck panel.

Optionally, scanning a container truck panel to obtain laser point cloud data is completed by a data acquisition module, the data acquisition module are lidars which are at least one, the lidars are installed on one side of an electrical room close to the container truck lane.

Optionally, obtaining spatial straight lines of the edges of the keel of the container truck panel comprising obtaining spatial straight lines of one edge of the keel of the container truck panel.

Figure 8:
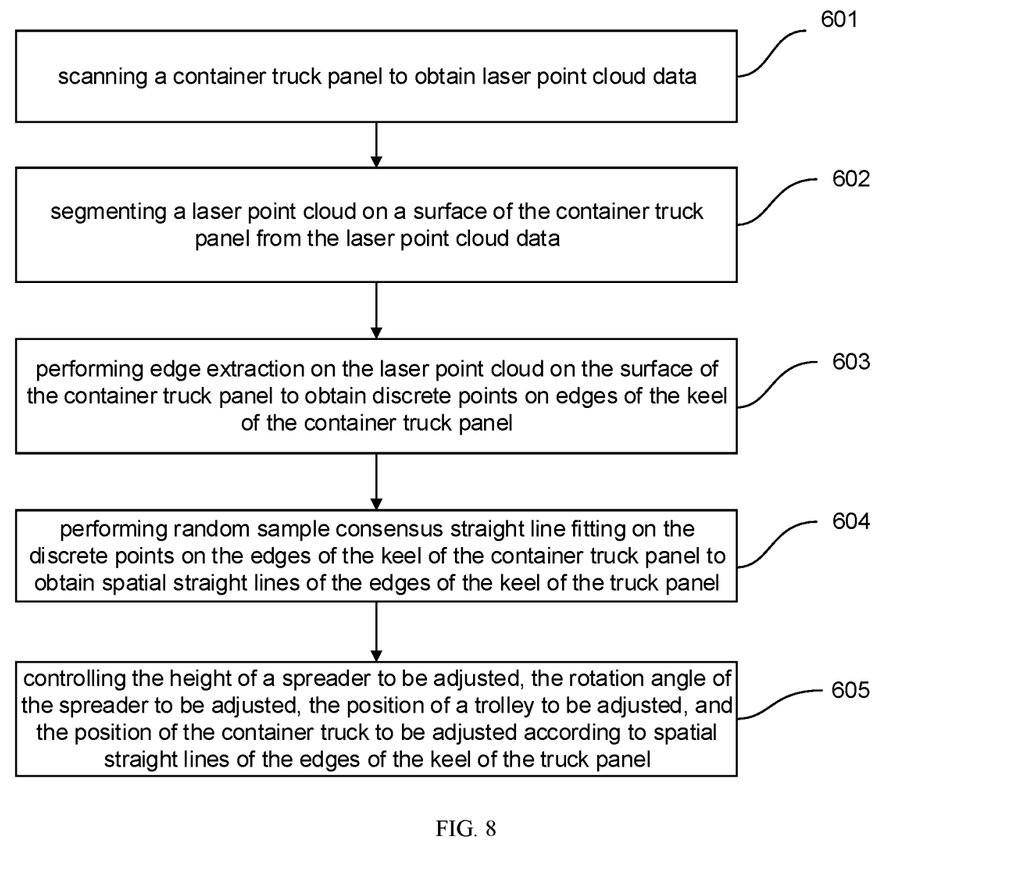
FIG. 8 is a flow chart of an automatic container loading and unloading method in another embodiment of the present invention.

Now refer to FIG. 8, FIG. 8 is a flow chart of an automatic container loading and unloading method in another embodiment of the present invention. Further comprising the following step, step 605: controlling the height of a spreader to be adjusted, the rotation angle of the spreader to be adjusted, the position of a trolley to be adjusted, and the position of the container truck to be adjusted according to spatial straight lines of the edges of the keel of the truck panel.

Optionally, obtaining spatial straight lines of the edges of the keel of the container truck panel comprising obtaining spatial straight lines of a first edge and spatial straight lines of a second edge of the keel of the container truck panel, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data.

In particular embodiment, the preset value of the included angle between spatial straight lines of the first edge and spatial straight lines of the second edge can be preset, the preset value can be preset by those skilled in the art based on empirical values. If the included angle is less than the preset value, fusing spatial straight lines of the first edge and spatial straight lines of the second edge, otherwise rescanning the container truck panel to obtain new laser point cloud data because the error between partial straight lines of the first edge and partial straight lines of the second edge is large. Wherein, for the plane fitting of laser point clouds at both ends, it is necessary to calibrate the two clusters of laser point clouds to the same coordinate system, carry out the front fusion of point clouds, and then adjust the spatial distance threshold of fitting points by setting the constraint relationship between the truck panel point cloud plane and the spatial plumb plane, and carry out plane segmentation, so as to obtain the laser point cloud clusters on the upper surface of the truck panel.

Optionally, horizontally projecting spatial straight lines of the edges of the keel of the container truck panel to obtain the height of a spreader to be adjusted, the rotation angle of the spreader to be adjusted, the position of a trolley to be adjusted and the position of the container truck to be adjusted.

In summary, an automatic container loading and unloading apparatus and method provided by the present embodiment, after obtaining the laser point cloud data, segmenting a laser point cloud on a surface of the container truck panel from the laser point cloud data, performing edge extraction on the laser point cloud on the surface of the container truck panel to obtain discrete points on edges of the keel of the truck panel, performing random sample consensus straight line fitting on the discrete points on the edges of the keel of the truck panel, achieving stronger robustness and higher accuracy, so that a container is loaded onto the container truck panel with higher precision and lower calculation amount.

Further, obtaining spatial straight lines of two edges of the keel of the container truck panel, wherein spatial straight lines of the first edge is used for controlling the height of a spreader to be adjusted, the rotation angle of the spreader to be adjusted, the position of a trolley to be adjusted, and the position of the container truck to be adjusted, and spatial straight lines of the second edge is used for calibrating and fusing spatial straight lines of the first edge, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data, so that the accuracy of the automatic container loading and unloading can be improved.

Although the present invention has been disclosed as above in a preferred embodiment, it is not intended to limit the present invention. Any person skilled in the art can make some modifications and improvements without departing from the spirit and scope of the present invention. Therefore, the scope of protection of the present invention should be subject to those defined in the claims.

The invention claimed is:

1. An automatic container loading and unloading apparatus, characterized in that comprising:
   a data acquisition module, used for scanning a container truck panel to obtain laser point cloud data;
   a data preprocessing module, used for segmenting a laser point cloud on a surface of the container truck panel from the laser point cloud data;
   a key point extraction module, used for performing edge extraction on the laser point cloud on the surface of the container truck panel to obtain discrete points on edges of the keel of the container truck panel;
   a straight line fitting module, used for performing random sample consensus straight line fitting on the discrete points on the edges of the keel of the container truck panel to obtain spatial straight lines of the edges of the keel of the truck panel;
   obtaining spatial straight lines of the edges of the keel of the container truck panel comprising obtaining spatial straight lines of a first edge and spatial straight lines of a second edge of the keel of the container truck panel, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data.

2. The automatic container loading and unloading apparatus according to claim 1, characterized in that further comprising:
   a four-dimensional control module, used for controlling the height of a spreader to be adjusted, the rotation angle of the spreader to be adjusted, the position of a trolley to be adjusted, and the position of the container truck to be adjusted according to spatial straight lines of the edges of the keel of the container truck panel.

3. The automatic container loading and unloading apparatus according to claim 1, characterized in that the data acquisition module are lidars which are at least one, the lidars are installed on one side of an electrical room close to the container truck lane.

4. The automatic container loading and unloading apparatus according to claim 1, characterized in that further comprising the following step:
   controlling the height of a spreader to be adjusted, the rotation angle of the spreader to be adjusted, the position of a trolley to be adjusted, and the position of the container truck to be adjusted according to spatial straight lines of the edges of the keel of the truck panel.

5. An automatic container loading and unloading method, characterized in that comprising the following steps:
scanning a container truck panel to obtain laser point cloud data;
segmenting a laser point cloud on a surface of the container truck panel from the laser point cloud data;
performing edge extraction on the laser point cloud on the surface of the container truck panel to obtain discrete points on edges of the keel of the container truck panel;
performing random sample consensus straight line fitting on the discrete points on the edges of the keel of the container truck panel to obtain spatial straight lines of the edges of the keel of the truck panel;
obtaining spatial straight lines of the edges of the keel of the container truck panel comprising obtaining spatial straight lines of a first edge and spatial straight lines of a second edge of the keel of the container truck panel, judging whether the included angle between spatial straight lines of the first edge and spatial straight lines of the second edge is less than the preset value, if the included angle is less than the preset value, fusing spatial straight lines of the first edge and spatial straight lines of the second edge, otherwise rescanning the container truck panel to obtain new laser point cloud data.

6. The automatic container loading and unloading method according to claim 5, characterized in that scanning a container truck panel to obtain laser point cloud data is completed by a data acquisition module, the data acquisition module are lidars which are at least one, the lidars are installed on one side of an electrical room close to the container truck lane.

7. The automatic container loading and unloading method according to claim 5, characterized in that further comprising horizontally projecting spatial straight lines of the edges of the keel of the container truck panel to obtain the height of a spreader to be adjusted, the rotation angle of the spreader to be adjusted, the position of a trolley to be adjusted and the position of the container truck to be adjusted.

8. The automatic container loading and unloading method according to claim 5, characterized in that further comprising horizontally projecting spatial straight lines of the edges of the keel of the container truck panel to obtain the height of a spreader to be adjusted, the rotation angle of the spreader to be adjusted, the position of a trolley to be adjusted and the position of the container truck to be adjusted.

* * * * *